Dec. 3, 1946.  A. L. KRONQUEST  2,412,157
OVERLOAD RELEASE MEANS
Original Filed Aug. 14, 1941   2 Sheets-Sheet 1
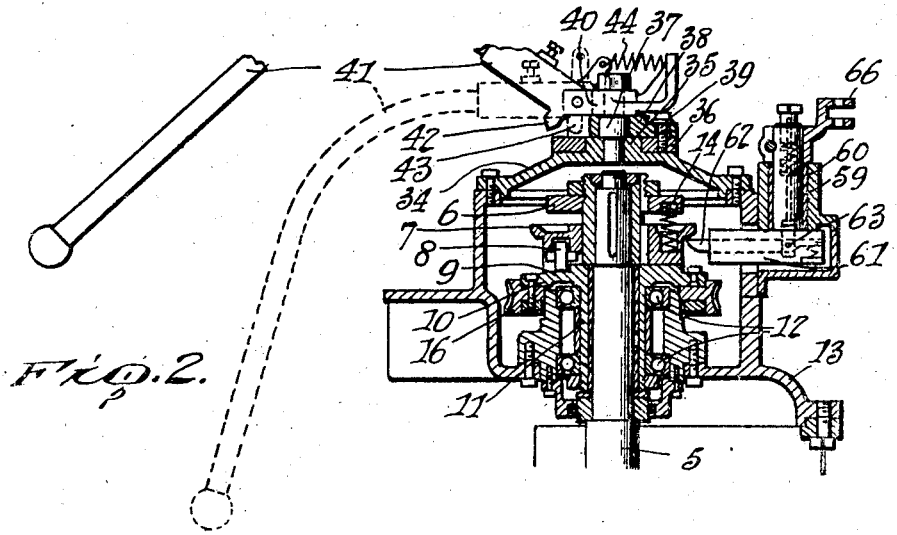
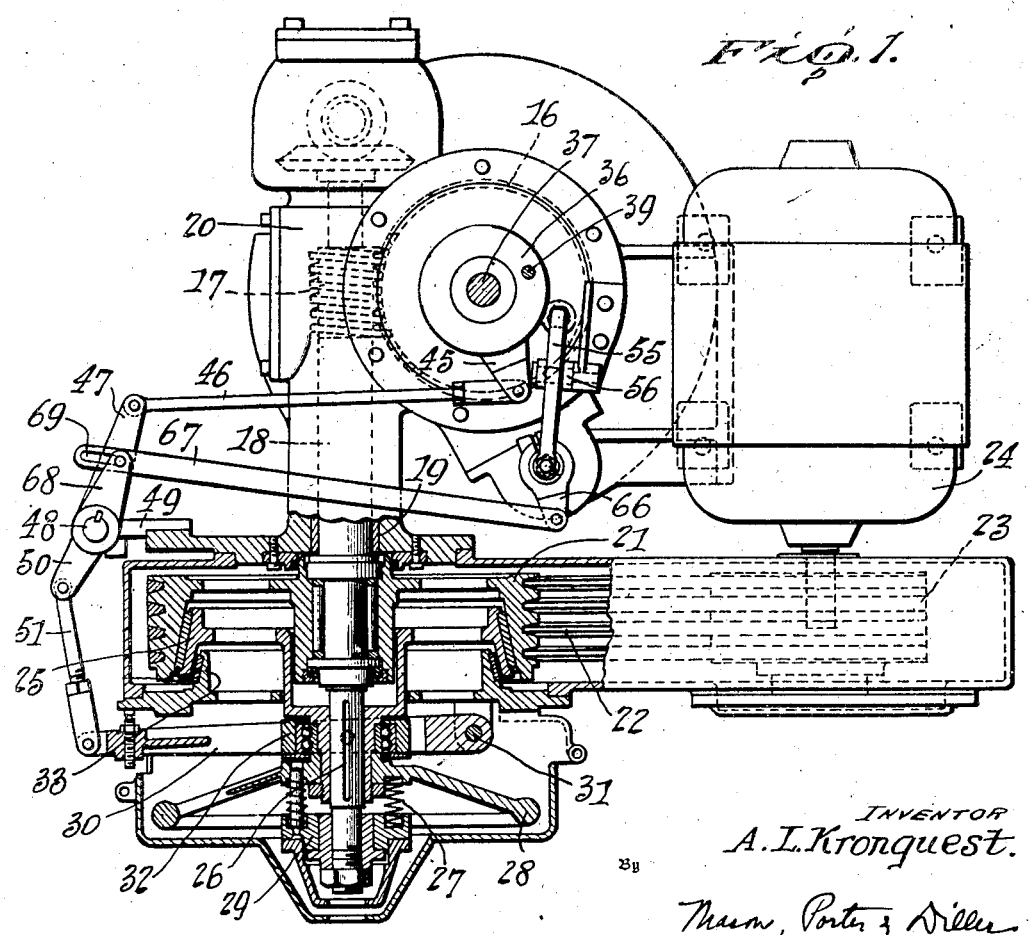
INVENTOR
A. L. Kronquest.
ATTORNEYS

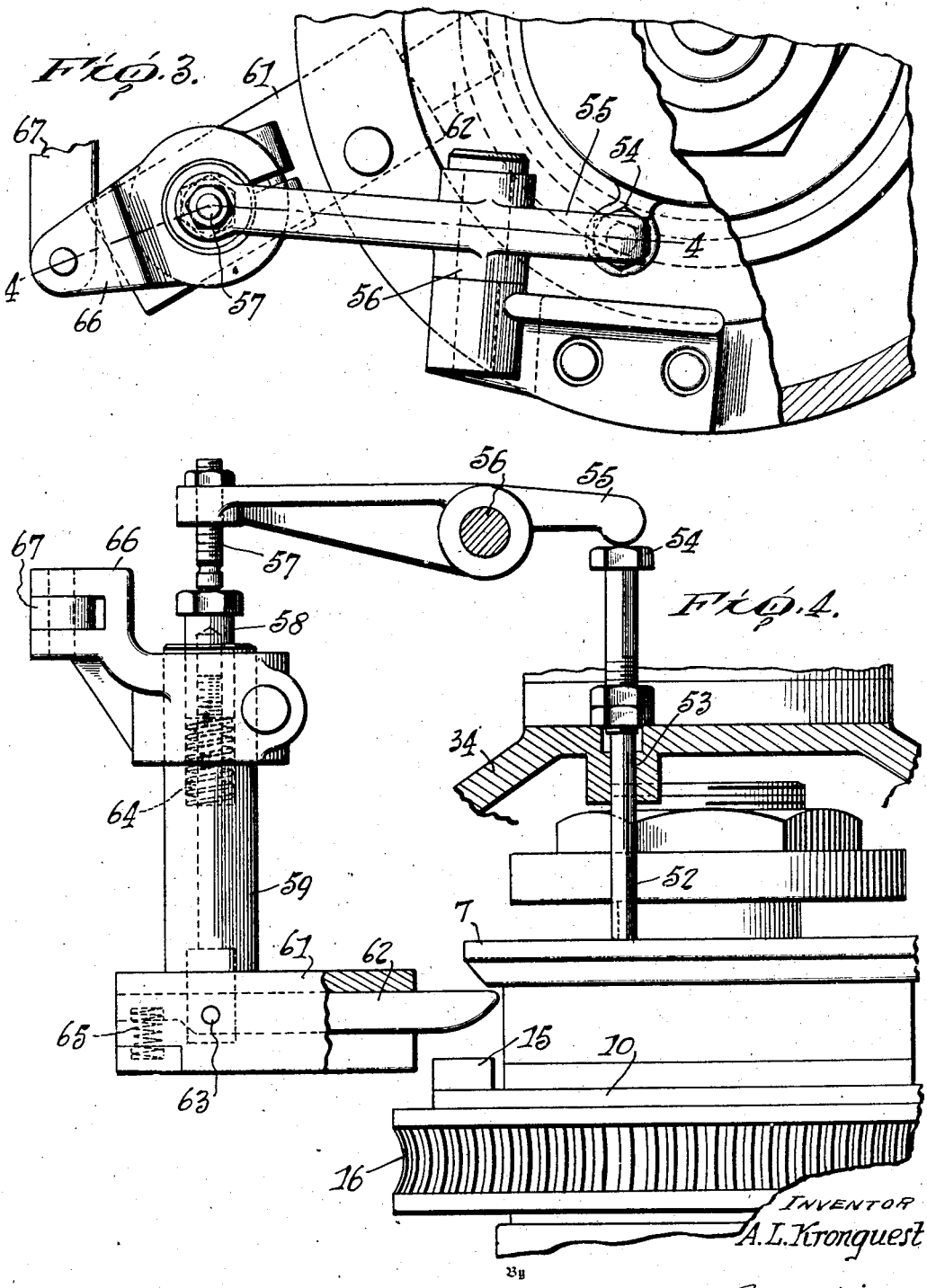

Patented Dec. 3, 1946

2,412,157

UNITED STATES PATENT OFFICE 2,412,157

OVERLOAD RELEASE MEANS

Alfred L. Kronquest, Syracuse, N. Y., assignor to Continental Can Company, Inc., New York, N. Y., a corporation of New York Original application August 14, 1941, Serial No. 406,899. Divided and this application June 20, 1945, Serial No. 600,564

8 Claims. (Cl. 192—56)

1

The invention relates to certain new and useful improvements in overload release means which, while subject also to general use, is particularly adapted for use on the vacuumizing and closing machine disclosed in the copending application for U. S. Letters Patent Serial Number 406,899, filed by Alfred L. Kronquest on August 14, 1941, of which the present application constitutes a division.

An object of the invention is to provide in a machine of the character stated novel means for effecting stoppage of the machine manually, at the will of an operator, or automatically on the occasion of an overload, as by jamming of drive parts of the machine, or the like.

Another object of the invention is to provide a novel overload release means of the character stated including a motor, a shaft, a driver collar splined on the shaft and displaceable therealong upon imposition of an overload, means including a motor and a motor operation controlling clutch for imparting rotation to the collar, and means operable upon displacement of the driver collar as a result of an imposed overload to shift the clutch and discontinue the driving of the collar and shaft.

Another object of the invention is to provide an overload release means of the character stated in which the collar driving means includes a gear having an actuator lug projecting therefrom and being freely rotatable about the shaft and normally coupled with the driver collar through an overload release connection effective to displace said collar upon imposition of an overload, and in which there is included clutch disconnecting means operable upon each imposition of an overload to disconnect the clutch and including an actuator element placed in the path of movement of the actuator lug by displacement of the driver collar along the shaft.

With the above and other objects in view that will hereinafter appear, the nature of the invention will be more clearly understood by reference to the following detailed description, the appended claims, and the several views illustrated in the accompanying drawings.

In the drawings:

Figure 1 is a part plan and part horizontal sectional view of the apparatus embodying the invention, Figure 2 is a fragmentary vertical cross sectional view showing the driven shaft and the overload release parts mounted thereon.

Figure 3 is an enlarged fragmentary plan view and part horizontal section illustrating the means

2 for controlling the position of the clutch throw out collar member.

Figure 4 is a fragmentary sectional view taken substantially on the line 4—4 on Figure 3.

The overload release means forming the subject matter of this invention is associated with an uprightly disposed driven shaft 5 which comprises the main shaft in the machine forming the subject matter of the parent application of which this case constitutes a division.

An abutment plate 6 is affixed to the upper end of the shaft 5, and an overload release driver collar or ring 7 is splined on said shaft so as to rotate therewith and yet be capable of vertical sliding movement thereon. The collar 7 is equipped with three equidistantly spaced driving rollers 8 having their axes disposed radially with respect to the axis of the shaft 5 and being engageable in seats 9 in a driver disk 10 carried at the upper end of the sleeve 11 freely surrounding and providing bearing for the shaft 5 and in turn having anti-friction bearing at 12 in the frame portion 13. The collar 7 is constantly urged downwardly, to be thereby yieldably held in driving contact with the disk 10, by compression spring equipment 14 interposed between said collar and the abutment plate 6. See Figure 2.

The disk 10 carries a clutch throw out effecting lug 15 and has a worm gear ring 16 secured thereon. Rotation is imparted to the worm gear ring 16 and through the disk 10 and the collar 7 to the main shaft 5 by a worm gear 17 keyed upon a drive shaft 18 which is rotatable in bearings 19 in a drive housing 20 suitably supported at the upper portion of the machine framing. See Figures 1 and 2. A driving pulley 21 is freely rotatable about the shaft 18 and has rotation imparted thereto by V-belt equipment 22 from a pulley 23 secured upon the armature shaft of a motor 24 which is supported at the top on the machine framing. The pulley 21 has a cone clutch face which is engaged by a cone clutch member 25 splined on the drive shaft 18 as at 26. The clutch member 25 is normally held clutched against the pulley 21 by a spring equipment 27 interposed between the hub of the hand wheel 28 fixed to the sleeve of said clutch member and an abutment head 29 which is secured upon the shaft 18.

A clutch shifting lever 30 is pivoted, as at 31, in the housing and includes a yoke portion trunnion connected with the shifter ring 32, said lever being effective to shift the clutch member 25 against the compression of the spring equipment 27 to thereby release the driving connection and cause the clutch member to engage the brake surface 33 provided on the housing, thereby to discontinue rotation of said clutch member.

In the center of the top housing cover 34 there is provided an upstanding boss 35 about which a clutch shifter ring 36 is oscillatably mounted. A pivot pin 37 is secured in the boss, and a second shifter ring 38 is oscillatable about this pin atop the ring 36, said ring 38 being adjustably secured, by arcuate slot and screw equipment 39, to the underlying ring 36. A lever fulcrum bracket 40 is oscillatable about the pin 37 and pivotally supports a manual clutch shifter lever 41 having a latch lug 42 receivable in a notch 43 in the ring 38. A spring 44 attached to the bracket and to the lever normally holds the lever in an elevated position in which the latch lug 42 is disengaged from the notch 43. See Figure 2.

It is to be understood that whenever the lever 41 is forced down so as to engage the latching lug 42 in the notch 43, and is then swung about the axis of the pin 37, it will serve to turn the rings 36 and 38 and manually effect a disengagement of the clutch member 25 and a resultant stoppage of the main shaft drive. For this purpose the ring 38 is provided with a crank extension 45 which is connected by a link 46 with a crank 47 secured upon the upper end of a rock shaft 48. The rock shaft 48 is rockably mounted in frame bearing equipment 49 and carries a crank 50 at its lower end which is link-connected, as at 51, with the clutch shifter lever 30. The crank and link connections 51 act as a toggle lock when shifted slightly past the dead center position, thereby to hold the clutch lever in the clutch release position following each machine operation stoppage until the lever is intentionally shifted to again initiate operation of the machine. It is to be understood, of course, that the motor 24 operates continuously. See Figures 1 and 2.

It is also contemplated that the clutch shall be disengaged and the main shaft automatically stopped whenever a jam in the machine in which said shaft is employed imposes an overload upon the driving connections. For this purpose the overload release drive collar 7 which is free to move upwardly on the shaft 5 to unseat the driving roller equipment 8 whenever a jam occurs engages the lower end of a thrust pin 52 which is vertically-slidably mounted, as at 53, in the cover 34. The pin 52 carries an abutment head 54 at its upper end and this head underlies one end of a rock lever 55 pivoted intermediate its ends, as at 56, and having its other end equipped with a depending tappet 57. The tappet 57 is engageable with a plunger 58 vertically slidable in a rock shaft 59 having bearing, as at 60, in the housing and carrying a grooved carrier head 61 at its lower end. See Figures 2, 3 and 4.

Within the downwardly directed groove in the head 61 there is mounted a shiftable coupling member 62 which is pivoted, as at 63, to the lower end of the plunger 58 and has an end portion thereof extended inwardly in position for overlying the path of travel of the clutch throw-out lug 15. A spring 64 surrounding the plunger 58 in a bore enlargement in the shaft 59 normally holds the plunger in its elevated position with the coupling member 62 disposed well above the path of travel of the clutch throw-out lug 15.

It will be obvious that each time the overload release collar 7 is moved upwardly to break the drive connection between the driven worm ring 16 and the main shaft 5, the pin and lever equipments 52, 55 will act to depress the plunger 58 and cause the inwardly extended end of the coupling member 62 to be depressed into the path of travel of the clutch throw-out lug 15. When the lug 15 rotating with the disk 10 engages the depressed end of the member 62 it will impart a rocking motion to the shaft 59, and this motion will be effective through suitable crank and link connections to shift the clutch lever 30 and bring about a disengagement of the clutch member 25 and a stoppage of all machine parts other than the idly running motor and drive pulley 21.

The coupling member 62 is extended outwardly beyond its pivotal connection with the plunger 58, and a compression spring 65 is interposed beneath this extended end and a supporting shelf carried by the head 61. By reason of this equipment, should the plunger 58 be depressed at a time when the clutch throw-out lug 15 is immediately beneath the coupling member 62, said member 62 may engage on top of the lug and the spring 65 will take up the thrust of the plunger 58 so as to avoid breakage of parts and will thereafter cause the coupling member 62 to snap down into its intended position in the path of travel of the lug 15. See Figures 2, 3 and 4.

For the purpose of utilizing the rocking motion of the shaft 59 to disconnect the clutch, the shaft 59 is provided at its upper end with a crank 66 which is link-connected, as at 67, with a crank 68 secured upon the shaft 48 hereinbefore referred to and which is crank and link connected as at 50, 51 with the clutch lever 30. The link 67 is slotted, as at 69, at the point of its connection with the crank 68 so as to permit manual operation of the clutch 25 without affecting the overload disengagement mechanism. See Figure 1.

While one form of the invention has been shown for purposes of illustration, it is to be clearly understood that various changes in the details of construction and arrangement of parts may be made without departing from the spirit and scope of the invention as defined in the appended claims.

I claim:

1. In a machine of the character described, a main drive shaft, a driver collar splined on said shaft and displaceable therealong upon imposition of an overload, a driver gear freely rotatable about said shaft and normally coupled in driving relation with said collar through an overload release connection effective to displace said collar upon imposition of an overload, an actuater lug carried by said driver gear, motor driven means for imparting rotation to said driver gear and including a clutch, and clutch disconnecting means operable upon each imposition of an overload to disconnect the clutch and including an actuater element placed in the path of movement of the actuater lug by displacement of the driver collar along said shaft.

2. In a machine of the character described, a main drive shaft, a driver collar splined on said shaft and displaceable therealong upon imposition of an overload, a driver gear freely rotatable about said shaft and normally coupled in driving relation with said collar through an overload release connection effective to displace said collar upon imposition of an overload, an actuater lug carried by said driver gear, motor driven means for imparting rotation to said driver gear and including a clutch, clutch disconnecting means operable upon each imposition of an overload to disconnect the clutch and including an actuater element placed in the path of movement of the actuater lug by displacement of the driver collar along said shaft, and means yieldably mounting said actuater element so that it can yield if initially placed against the actuater lug instead of in the path of movement of the lug during a clutch disconnecting operation and then snap down into said path of movement as the lug moves away to be engaged by said lug when it next comes around.

3. In a machine of the character described, a main drive shaft, a driver collar splined on said shaft and displaceable therealong upon imposition of an overload, a driver gear freely rotatable about said shaft and normally coupled in driving relation with said collar through an overload release connection effective to displace said collar upon imposition of an overload, an actuater lug carried by said driver gear, motor driven means for imparting rotation to said driver gear and including a clutch, clutch disconnecting means, means operable upon each imposition of an overload to actuate the disconnecting means and including an actuater element placed in the path of movement of the actuater lug by displacement of the driver collar along said shaft, and manually operable means for actuating the clutch disconnecting means independently of the overload displacement of said collar.

4. In a machine of the character described, a main drive shaft, a driver collar splined on said shaft and displaceable therealong upon imposition of an overload, a driver gear freely rotatable about said shaft and normally coupled in driving relation with said collar through an overload release connection effective to displace said collar upon imposition of an overload, an actuater lug carried by said driver gear, motor driven means for imparting rotation to said driver gear and including a clutch, and clutch disconnecting means operable upon each imposition of an overload to disconnect the clutch and including a swingably mounted member placed in the path of movement of the actuater lug, a swingable clutch shifting lever, and crank and link connections between the swingably mounted member and the clutch shifting lever.

5. In a machine of the character described, a main drive shaft, a driver collar splined on said shaft and displaceable therealong upon imposition of an overload, a driver gear freely rotatable about said shaft and normally coupled in driving relation with said collar through an overload release connection effective to displace said collar upon imposition of an overload, an actuater lug carried by said driver gear, motor driven means for imparting rotation to said driver gear and including a clutch, and clutch disconnecting means operable upon each imposition of an overload to disconnect the clutch and including a swingably mounted member placed in the path of movement of the actuater lug, a swingable clutch shifting lever, manually operable means crank and link connected with the clutch shifting lever, and crank and link connections between the swingably mounted member and the clutch shifting lever, said last mentioned crank and link connections including lost motion means permitting the clutch lever to be shifted manually to disengage the clutch independently of movement of said swingably mounted member.

6. Apparatus as defined in claim 3 in which the manually operable means includes a ring notched at its periphery and swingable about an upright pivot and having a crank extension having crank and link connection with the clutch lever, a manually operable ring shifter having an actuater finger engageable in the ring notch, said ring shifter being swingable about a horizontal axis for engaging the finger with said notch or disengaging the finger from the notch and also about the center of said ring, and spring means normally holding the ring shifter with its finger disengaged from said notch.

7. Apparatus as defined in claim 5 in which the manually operable means includes a ring notched at its periphery and swingable about an upright pivot and having a crank extension having crank and link connection with the clutch lever, a manually operable ring shifter having an actuater finger engageable in the ring notch, said ring shifter being swingable about a horizontal axis for engaging the finger with said notch or disengaging the finger from the notch and also about the center of said ring, and spring means normally holding the ring shifter with its finger disengaged from said notch.

8. In a machine of the character described, a main drive shaft, a driver collar splined on said shaft and displaceable therealong upon imposition of an overload, a driver gear freely rotatable about said shaft and normally coupled in driving relation with said collar through an overload release connection effective to displace said collar upon imposition of an overload, an actuater lug carried by said driver gear, motor driven means for imparting rotation to said driver gear and including a clutch, and clutch disconnecting means operable upon each imposition of an overload to disconnect the clutch and including a swingably mounted member placed in the path of movement of the actuater lug, a swingable clutch shifting lever, manually operable means crank and link connected with the clutch shifting lever, and crank and link connections between the swingably mounted member and the clutch shifting lever, certain of said link connections constituting toggle lock links effective when the shifting lever is shifted to the clutch releasing position to lock-secure the released condition of the clutch.

ALFRED L. KRONQUEST.